MEMORY APPARATUS

Filed Dec. 19, 1962

INVENTORS
WILLIAM W. DAVIS
EDWARD L. KRIEGER
BY Herbert F. Somermeyer
ATTORNEY

United States Patent Office 3,252,152
Patented May 17, 1966

3,252,152
MEMORY APPARATUS

William W. Davis, Minneapolis, and Edward L. Krieger, St. Paul, Minn., assignors to Sperry Rand Corporation, New York, N.Y., a corporation of Delaware Filed Dec. 19, 1962, Ser. No. 245,883
2 Claims. (Cl. 340—174)

This invention relates in general to memory apparatus and in particular to a magnetic memory element that provides nondestructive readout of the information stored therein through the temporary alteration of the magnetization of only a small portion of the memory element which small portion's magnetization is normally in alignment with the remanent magnetization outside of said small portion. This invention is an improvement over that invention disclosed and claimed in our co-pending application of Krieger et al., Serial No. 74,508, filed December 8, 1960, now abandoned, and assigned to the same assignee as the present invention.

In our above referenced co-pending application there is disclosed a bistable magnetic memory element providing nondestructive readout of the information stored therein. This element includes a single domain ferromagnetic core having uniaxial anisotropy along which the core's preferred axis of remanent magnetization lies. Magnetic coupling of the interrogate and readout windings to the core is restricted to a small portion thereof while that of the write winding preferably encompasses the entire core, with all three windings having their magnetic axes oriented parallel to the core's preferred axis of magnetization. Writing into the core is accomplished by passing a suitable current pulse down the write winding which sets the core into one or the other of its two magnetic stable states as determined by the current pulse polarity. As the core has a substantially uniform magnetic characteristic throughout its planar dimensions, essentially all portions of the core are set into magnetic alignment parallel or anti-parallel to the core's preferred axis. Readout from the core is accomplished by passing a suitable current pulse down the interrogate winding which is effectively coupled to only a small portion of the core. If the field set up by the interrogate pulse in the small portion of the core is parallel to that of the core's remanent magnetization no alteration of the magnetization of the core's small portion takes place, which causes no readout signal to be induced in the readout winding. However, if the field set up by the interrogate pulse in the small portion of the core is anti-parallel to that of the core's remanent magnetization, the magnetization of a core's small portion is temporarily altered which alteration causes a readout signal to be induced in the readout winding. The appearance or non-appearance of a readout signal in the readout winding thus indicates the information stored in the core.

As the readout signal induced in the readout winding is generated by a temporary alteration of the magnetization of the core's small portion and as the small portion is a small part of the core, e.g., 10% of the core's planar area, with the core's diameter being in the order of magnitude of 0.050 inch, it is apparent that field and signal amplitudes are quite small. With interrogate signal coupling to the readout winding causing noise signals to be induced therein, it is apparent that the amplitude of the readout signal induced in the readout winding should be as large as possible to provide a workable signal-to-noise ratio. This present invention provides a means whereby the amplitude of the readout signal of a stored "1" as compared to a stored "0" is greatly increased over that of the above referenced application so as to provide a higher signal-to-noise ratio.

Magnetic memory cores as used in the preferred embodiment herein, having single domain properties and uniaxial anisotropy may be fabricated in accordance with S. M. Rubens' Patent No. 2,900,282 issued August 18, 1959. The term "single domain" property when used herein, may be considered the characteristic of a three-dimensional element of magnetic material having a thin dimension which is substantially less than the width and length thereof wherein no domain walls can exist parallel to the large surface of the element. It has been shown by S. M. Rubens et al., Patent No. 3,030,612, issued April 17, 1962, that by the use of the combination of longitudinal and transverse fields—with respect to the core's preferred axis of magnetization—the core's switching speed is greatly increased. As the amplitude of the signal induced in the readout winding is a function of the coupling field's time rate of change, increase of the core's switching speed which increases the core's external field's time rate of change, results in an increased readout signal amplitude and consequently an improved signal-to-noise ratio. Accordingly, the primary object of this invention is to provide a memory apparatus having an improved signal-to-noise ratio.

Another object of this invention is to provide a nondestructive readout memory apparatus utilizing longitudinal and transverse switching fields to provide an increased readout signal amplitude.

Another object of this invention is to provide a nondestructive readout memory apparatus wherein the magnetic state of the core is determined by the coupling of the interrogate field to only a small portion of the core whereby the small portion's magnetization is or is not temporarily altered as determined by the core's magnetic state.

Another object of this invention is to provide a nondestructive readout memory apparatus wherein a bias field is applied transverse to the preferred axis of the single domain core so as to rotate the core's magnetization to a position which is orthogonal or transverse to a readout-interrogate winding pair which pair is transverse to said core's preferred axis.

Another object of this invention is to provide a nondestructive readout memory apparatus wherein a bias field rotates the core's magnetization orthogonal or transverse to a readout-interrogate winding pair so as to provide upon interrogation a substantial readout signal for only one of said core's remanent magnetic states.

A further object of this invention is to provide a nondestructive readout memory apparatus of only one magnetic core.

A still further object of this invention is to provide a nondestructive readout memory apparatus which utilizes a transverse interrogate field to increase the switching speed of a single domain magnetic memory element.

These and other more detailed and specific objectives will be disclosed in the course of the following specification, reference being had to the accompanying drawings, in which.

Figure 1:
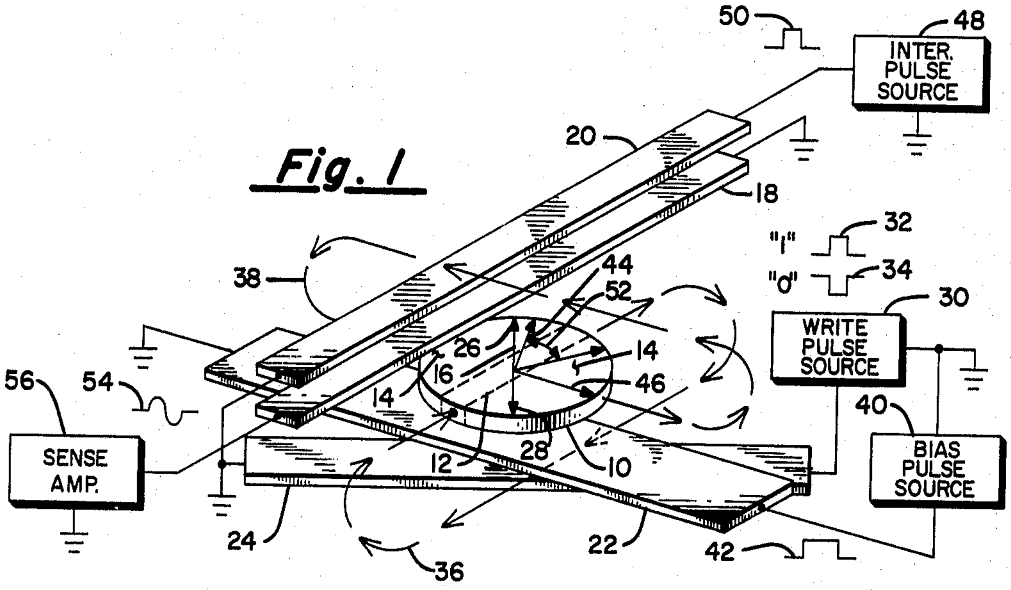
FIG. 1 is an exploded view of a nondestructive readout memory element utilizing a transverse bias field with a single domain core.

Referring to FIG. 1 there is shown a core 10 which is arbitrarily divided into two magnetic portions; small portion 12 and large outside-portion 14. Core 10 is preferably a single domain ferromagnetic element having uniaxial anisotropy providing a preferred axis 16 along which the core's remanent magnetization lies and has a substantially rectangular hysteresis loop characteristic when subjected to magnetic fields along said preferred axis. Small portion 12 is oriented approximately 30° transverse to preferred axis 16. However, as this relationship is not critical, it is not to be construed as a limitation thereto but is merely chosen for illustration only. Readout winding 18 lies immediately above small portion 12 of core 10 with interrogate winding 20 lying immediately above readout winding 18 in a stacked relationship therewith. Bias winding 22 lies immediately below core 10 and is oriented orthogonal to readout winding 18 and interrogate winding 20. Write winding 24 lies immediately below bias winding 22 and is oriented orthogonal to preferred axis 16 of core 10. Write winding 24 is illustrated as being of substantially the same width as that of core 10 in the area of core 10. This provides maximum coupling therebetween. Bias winding 22 is for the same reasons illustrated as being substantially the same width as that of core 10 in the area of core 10. Readout winding 18 and interrogate winding 20, conversely, are illustrated as being of substantially less width as that of portion 12 so as to limit the effective area of portion 12 to approximately 10% of the area of core 10. In an exemplary embodiment core 10 might be of 81Ni-19Fe composition, 0.050 inch in diameter and 2000 Angstroms thick with a coercivity of approximately 3 oersteds.

As most logic uses of a magnetic memory element utilize a substantial signal amplitude as indicative of a "1" and an insubstantial signal amplitude indicative of a "0," the apparatus illustrated in FIG. 1 shall be considered to store a "1" when the remanent magnetization of core 10 is as indicated by vector 26 and to store a "0" when the remanent magnetization of core 10 is as indicated by vector 28.

*Write operation*

Writing in of information into core 10 is accomplished by passing a current of proper polarity down write winding 24. For the writing of a "1," pulse source 30 couples write "1" pulse 32 to winding 24. By use of the right-hand rule it can be seen that pulse 32 sets up a clockwise magnetic field about winding 24 which in the area of core 10 is of such a direction and intensity as to set the magnetization of core 10 into the direction of vector 26. Conversely, for the writing in of a "0," pulse source 30 couples write "0" pulse 34 to winding 24. This sets up a counterclockwise magnetic field about winding 24 which in the area of core 10 is of such a direction and intensity as to set the magnetization of core 10 into the direction of vector 28. As vector 26 indicative of a stored "1" and vector 28 indicative of a stored "0" lie along preferred axis 16 of core 10 and as the coercivity of core 10 is fairly high at 3 oersteds, such magnetic stable states are substantially unaffected by stray magnetic fields subject only to the normal write, bias and interrogate fields of normal magnetic memory element operation.

*Read operation*

Reading out of the information stored in core 10 is accomplished through the interaction of two fields; bias field 36 and interrogate field 38. The bias field biases the magnetization of core 10 to either one of two predetermined positions with respect to the interrogate and readout windings and the interrogate field rotates or does not rotate the biased magnetization of core 10 depending upon the information initially stored therein. The rotation or non-rotation of the biased magnetization of core 10 is detected by readout winding 18 as a substantial or insubstantial signal induced therein. To initiate the readout cycle, pulse source 40 couples bias pulse 42 to bias winding 22. Pulse 42 sets up a clockwise magnetic field about winding 22 which in the area of core 10 is of such direction and intensity as to rotate the stored "1" vector 26 to the position of biased stored "1" vector 44 and to rotate the stored "0" vector 28 to the position of biased stored "0" vector 46. The direction and intensity of the bias field in the area of core 10 is of a critical nature and must be determined empirically for each memory apparatus embodiment. However, the main criteria essential to the proper operation of this apparatus as regards the bias field, is that the direction and intensity of the bias field in the area of core 10 is such as to rotate the remanent magnetization of a stored "0" as illustrated by vector 28 into a position which is orthogonal to interrogate winding 20 as illustrated by vector 46, and is such as to rotate the remanent magnetization of a stored "1" as illustrated by vector 26 into a position which is substantially not orthogonal to interrogate winding 20, as illustrated by vector 44.

With core 10 subjected to bias field 36, and having stored therein a "1," as illustrated by vector 44, readout is as follows: Pulse source 48 couples interrogate pulse 50 to interrogate winding 20. This sets up a clockwise magnetic field 38 about winding 20 which in the area of small portion 12 is of such a direction and intensity as to rotate the biased stored "1" vector 44 through an angle 52. This rotation of the magnetization of small portion 12 sets up a magnetic field which couples readout winding 18 generating readout signal 54 which is, in turn, coupled to amplifier 56. Presence of the significant signal 54 at amplifier 56 indicates that a "1" is stored in core 10.

With core 10 subjected to bias field 36 and having stored therein a "0" as illustrated by vector 46, readout is as follows: Pulse source 48 couples interrogate pulse 50 to interrogate winding 20. This sets up a clockwise magnetic field 38 about winding 50 which in the area of small portion 12 is parallel to the biased stored "0" vector 46. As bias field 38 and vector 46 are parallel, no rotation of small portion 12 magnetization occurs. No significant magnetic field is set up to couple interrogate winding 20, and, consequently, no significant readout signal is coupled to amplifier 56, which condition is indicative that a "0" is stored in core 10.

Figure 2:
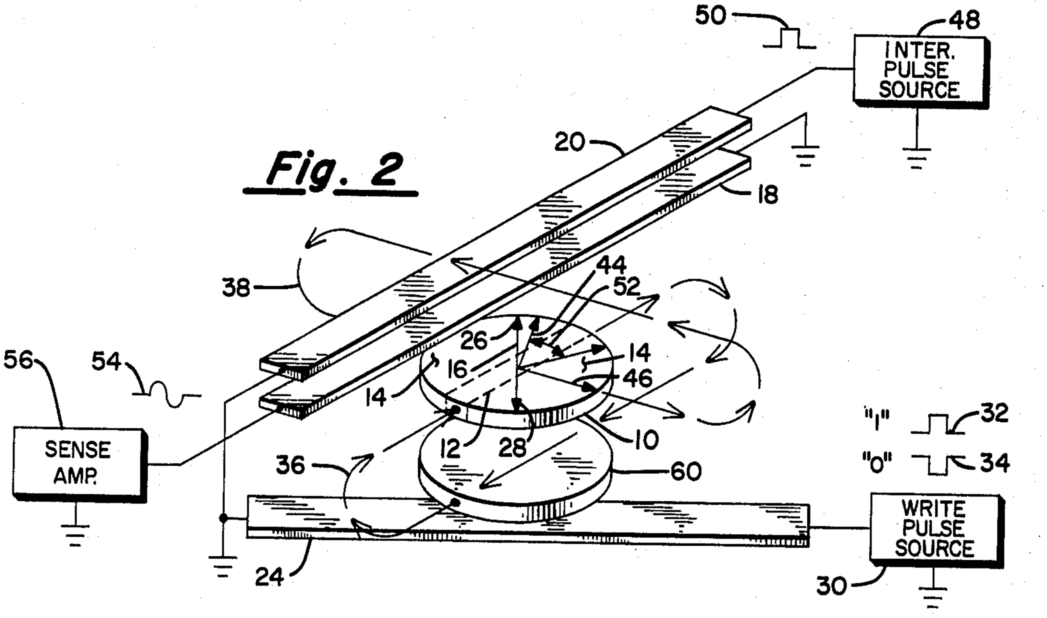
FIG. 2 is an exploded view of the nondestructive readout memory element of FIG. 1 utilizing a transverse bias field provided by a second bias core.

Referring to FIG. 2, there is shown an embodiment similar to that of FIG. 1 except that bias winding 22, pulse source 40, and pulse 42 are deleted and replaced by bias core 60. Bias core 60 may be of any material providing the necessary magnetic field characteristics of bias field 36 (as explained with respect to FIG. 1 operation) are maintained. In this configuration, bias core 60 provides the necessary bias field 36 in the area of core 10 similar to that disclosed in A. V. Pohm et al., Patent No. 3,015,807 issued January 2, 1962. However, in this present configuration, the bias field is a fixed, unidirectional field and is not a function of the information stored in the memory element. In this respect, bias core 60 is similar to the bias core disclosed in R. L. Moore's patent application, Serial No. 88,789, filed February 13, 1961, now Patent No. 3,095,555, and assigned to the same assignee as the present invention.

Figure 3:
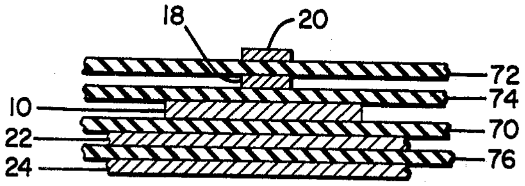
FIG. 3 is a cross sectional view of the embodiment of FIG. 1 illustrating the stacked relationship of the elements thereof.

It is to be appreciated that the illustrated embodiments of FIGS. 1 and 2 are only presented to illustrate the overall arrangement of thin ferromagnetic film cores and coupling conductors with no intent to include the necessary supporting and insulating layers. FIG. 3 presents a diagrammatic illustration of the stacked relationship of a core with a plurality of printed circuit conductors including the necessary supporting and insulating layers. In this illustration, core 10 is disposed upon glass substrate 70 with lines 18 and 20 disposed upon insulator 72 the assembly thereof separated from core 10 by insulator 74. On the far side of substrate 70 from core 10 line 22 is disposed upon insulator 76. A typical core plane assembly may include fabrication of the printed circuit conductors from a 0.0025 inch thick sheet of polyethylene terephthalate copper-coated with a 0.0003 thick layer of copper wherein predetermined portions of the copper are etched away leaving the printed circuit conductors and wherein a 2000 Angstroms thick ferromagnetic film is vacuum-deposited upon a 0.006 inch thick glass substrate as disclosed in the aforementioned Rubens' Patent No. 2,900,282. The separate elements are then assembled into a single unitary core stack by coating the elements with an adhesive material and pressing the elements together. In view of the above remarks, it is to be understood that the illustration of FIG. 3 is not intended to represent actual or comparative dimensions or sizes but is presented to better understand the illustrated embodiment of FIGS. 1 and 2.

Thus, it is apparent that the illustrated embodiments of applicants' invention have achieved nondestructive readout of a magnetic memory element.

It is understood that suitable modifications may be made in the structure as disclosed provided such modifications come within the scope and spirit of the appended claims.

Having now, therefore, fully illustrated and described our invention, what we claim to be new and desire to protect by Letters Patent is:

1. A nondestructive readout magnetic memory element including a bistable, single-domain ferromagnetic core having uniaxial anisotropy along which the core's preferred axis of remanent magnetization lies and having a substantially rectangular hysteresis loop characteristic when subjected to magnetic fields parallel to said preferred axis, write means magnetically coupled to said core for placing said core in either one of said remanent magnetic bistable states, readout means magnetically coupled substantially to only a small portion of said core for sensing the magnetic state of said core, interrogate means magnetically coupled substantially to only said small portion of said core for only temporarily altering the magnetic state of said small portion, and the remanent magnetization of said core outside of said small portion being operative to force the magnetization of said small portion into alignment therewith after the magnetization of said small portion has been temporarily altered by said interrogate means, the improvement comprising:

magnetic coupling means of said readout means and said interrogate means oriented substantially parallel to each other and to said small portion and transverse to said preferred axis, bias means magnetically coupled to said core providing a magnetic bias field in the area of said core for biasing the magnetization of said core transverse to said readout means coupling means when said core's remanent magnetization is in a first bistable state and orthogonal to said readout means coupling means when said core's remanent magnetization is in a second bistable state, said interrogate means effecting a substantial, temporary alteration of said small portion's magnetization when said core is in said first biased magnetic state and effecting an insubstantial alteration of said small portion's magnetization when said core is in said second biased magnetic state, and said readout means detecting said substantial and insubstantial alterations of said small portion's magnetization as an indication of said core's remanent magnetic stable state.

2. A nondestructive readout magnetic memory element including a bistable, single-domain ferromagnetic core having uniaxial anisotropy along which the core's preferred axis of remanent magnetization lies and having a substantially rectangular hysteresis loop characteristic when subjected to magnetic fields parallel to said preferred axis, write means magnetically coupled to said core for placing said core in either one of said remanent magnetic bistable states, readout means magnetically coupled to only a small portion of said core for sensing the magnetic state of said core, interrogate means magnetically coupled substantially to only said small portion of said core for only temporarily altering the magnetic state of said small portion, and the remanent magnetization of said core outside of said small portion being operative to force the magnetization of said small portion into alignment therewith after the magnetization of said small portion as an indication of said core's remanent magmeans, the improvement comprising:

magnetic coupling means of said readout means and said interrogate means oriented substantially parallel to each other and to said small portion and transverse to said preferred axis, bias means comprising an element of magnetic material magnetically coupled to said core providing a magnetic bias field in the area of said core for biasing the magnetization of said core transverse to said readout means coupling means when said core's remanent magnetization is in a first bistable state and orthogonal to said readout means coupling means when said core's remanent magnetization is in a second bistable state, said interrogate means effecting a substantial, temporary alteration of said small portion magnetization when said core is in said first biased magnetic state and effecting an insubstantial alteration of said small portion magnetization when said core is in said second biased magnetic state, and said readout means detecting said substantial and insubstantial alterations of said small portion's magnetization as an inidcation of said core's remanent magnetic stable state.

References Cited by the Examiner

UNITED STATES PATENTS 3,125,745 3/1964 Oakland ____________ 340—174

BERNARD KONICK, *Primary Examiner.*

IRVING L. SRAGOW, *Examiner.*

S. M. URYNOWICZ, *Assistant Examiner.*